United States Patent
Hsieh

(10) Patent No.: US 8,250,269 B2
(45) Date of Patent: Aug. 21, 2012

(54) MASTER/SLAVE DEVICE SYSTEM

(75) Inventor: Ming-Chih Hsieh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 324 days.

(21) Appl. No.: 12/780,161

(22) Filed: May 14, 2010

(65) Prior Publication Data

US 2011/0238875 A1    Sep. 29, 2011

(30) Foreign Application Priority Data

Mar. 24, 2010  (CN) .......................... 2010 1 0131445

(51) Int. Cl.
*G06F 13/00* (2006.01)
*G06F 3/00* (2006.01)
*G06F 1/00* (2006.01)

(52) U.S. Cl. .............................. 710/104; 710/9; 713/330

(58) Field of Classification Search ............ 710/3, 8–10, 710/15, 19, 300, 104, 305; 713/300, 310, 713/330
See application file for complete search history.

(56) References Cited

U.S. PATENT DOCUMENTS

| | | | | |
|---|---|---|---|---|
| 5,034,878 | A * | 7/1991 | Haapala et al. | 709/221 |
| 5,175,822 | A * | 12/1992 | Dixon et al. | 710/9 |
| 6,105,077 | A * | 8/2000 | Kimura | 710/9 |
| 6,738,920 | B1 * | 5/2004 | Horne | 713/500 |
| 7,328,286 | B2 * | 2/2008 | Vinnemann | 710/9 |
| 2002/0093303 | A1 * | 7/2002 | Lo | 318/569 |
| 2003/0216832 | A1 * | 11/2003 | Sudolcan | 700/239 |
| 2004/0117537 | A1 * | 6/2004 | Marcel Vandensande | 710/305 |
| 2005/0132109 | A1 * | 6/2005 | Steger | 710/104 |
| 2008/0307131 | A1 * | 12/2008 | Simon | 710/105 |
| 2009/0228609 | A1 * | 9/2009 | McFarland | 710/4 |
| 2009/0240859 | A1 * | 9/2009 | Hsieh | 710/110 |
| 2011/0055442 | A1 * | 3/2011 | Ward et al. | 710/110 |
| 2011/0197000 | A1 * | 8/2011 | Hsieh | 710/110 |
| 2011/0197001 | A1 * | 8/2011 | Hsieh | 710/110 |

* cited by examiner

*Primary Examiner* — Thomas J Cleary
(74) *Attorney, Agent, or Firm* — Altis Law Group, Inc.

(57) ABSTRACT

A master/slave device system includes a baseboard, a master device connected to the baseboard, and at least one slave device communicatively connected to the master device. The baseboard provides a power source. A switch connects the power source and the at least one slave device. The switch is capable of being switched on when a predetermined time is reached. The at least one slave device is capable of automatically setting an address at the moment the switch is switched on. The master device is capable of identifying the at least one slave device using the address.

14 Claims, 4 Drawing Sheets

MASTER/SLAVE DEVICE SYSTEM

BACKGROUND

1. Technical Field

The present disclosure relates to a master/slave device system capable of automatically assigning addresses to slave devices.

2. Description of Related Art

A typical master/slave device system includes a master device and a plurality of slave devices connected to the master device via a bus, such as RS485 bus, RS442 bus, or other bus types. The master device can communicate with the slave devices via the bus. To enable access thereto, each slave device is assigned a unique address. To communicate with a target slave device, the master device sends the address of the target slave device and a read/write flag, according to which the target slave device can receive or transmit data and reply with a 1-bit acknowledgement. However, in such a master/slave device system, each slave device requires plural I/O pins of the master device for assignment of its address. The number of slave devices in the master/slave device system is limited by the availability of I/O pins therein, limiting expansion of the system.

DETAILED DESCRIPTION

The disclosure is illustrated by way of example and not by way of limitation. In the figures of the accompanying drawings in which like references indicate similar elements. It should be noted that references to "an" or "one" embodiment in this disclosure are not necessarily to the same embodiment, and such references mean at least one.

Figure 1:
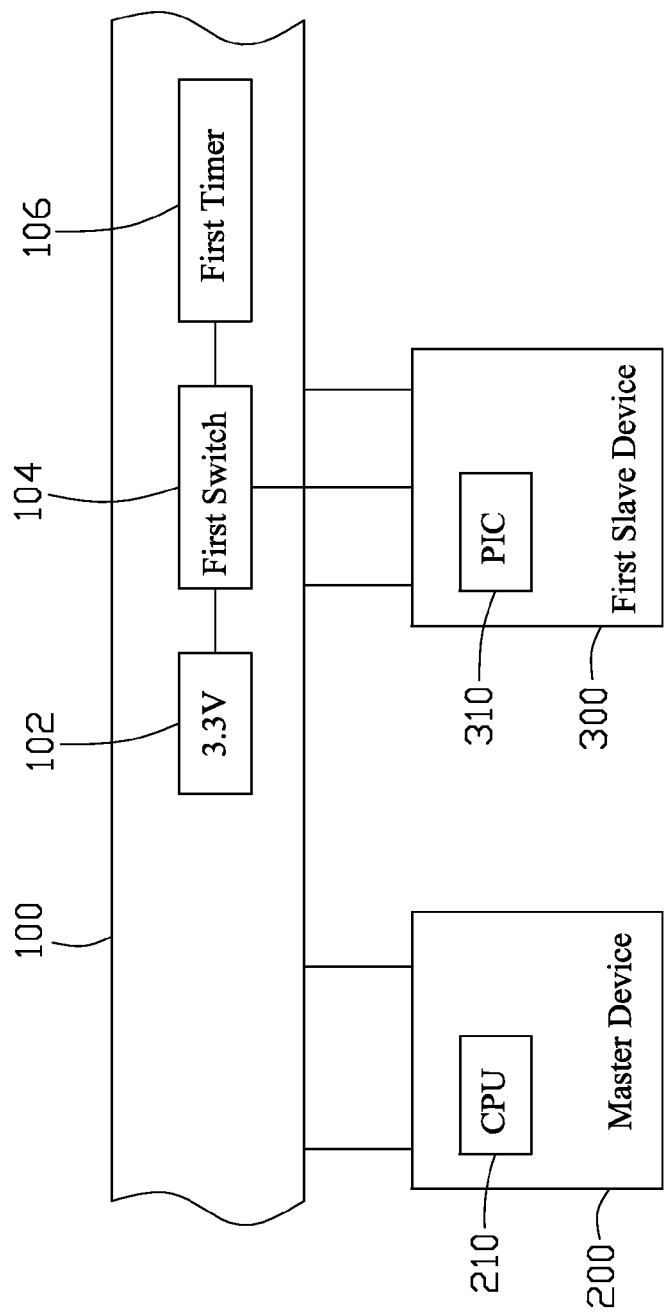
FIG. 1 is a block diagram of a master/slave device system according to an embodiment.

Referring to FIG. 1, an embodiment of a master/slave device system includes a baseboard 100, a master device 200, and a first slave device 300 capable of communicating with the master device 200 via a bus, such as RS485 bus, RS422 bus, I2C bus, SPI bus, or other bus type. The bus can be located on the baseboard 100. In one embodiment, the master device 200 includes a Central Processing Unit (CPU) 210, and the first slave device 300 includes a Peripheral Interface Controller (PIC) 310.

The baseboard 100 provides a 3.3V power source 102, required by the PIC 310 as a reference voltage for analog/digital conversion. A first switch 104 is connected between the 3.3V power source 102 and the PIC 310. A first timer 106 is connected to the first switch 104. When the system is powered on and the 3.3V power source is generated, the first timer 106 begins. If the counted time reaches a first predetermined point, such as 1 second, the first switch 104 switches on to supply the 3.3V power source 102 to the PIC 310 of the first slave device 300, at which time the PIC 310 sets an address for the first slave device 300 according to a waiting time for the 3.3V power source 102. The first slave device 300 can then be indentified by the master device 200 using the address.

Figure 2:
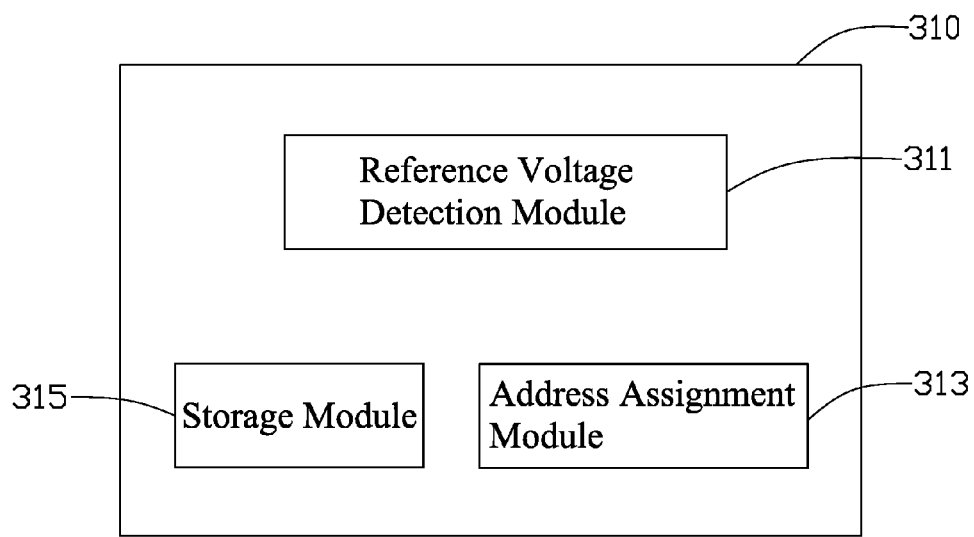
FIG. 2 is a block diagram of a Peripheral Interface Controller (PIC) of FIG. 1.

Referring to FIG. 2, the PIC 310 of the first slave device 300 includes a reference voltage detection module 311, an address assignment module 313, and a storage module 315. The reference voltage detection module 311 determines whether the PIC 310 receives the 3.3V power source 102. The address assignment module 313 automatically set the address for the first slave device 300 when the PIC 310 begins to be supplied by the 3.3V power source 102. The storage module 315 stores the address of the first slave device 300.

Figure 3:
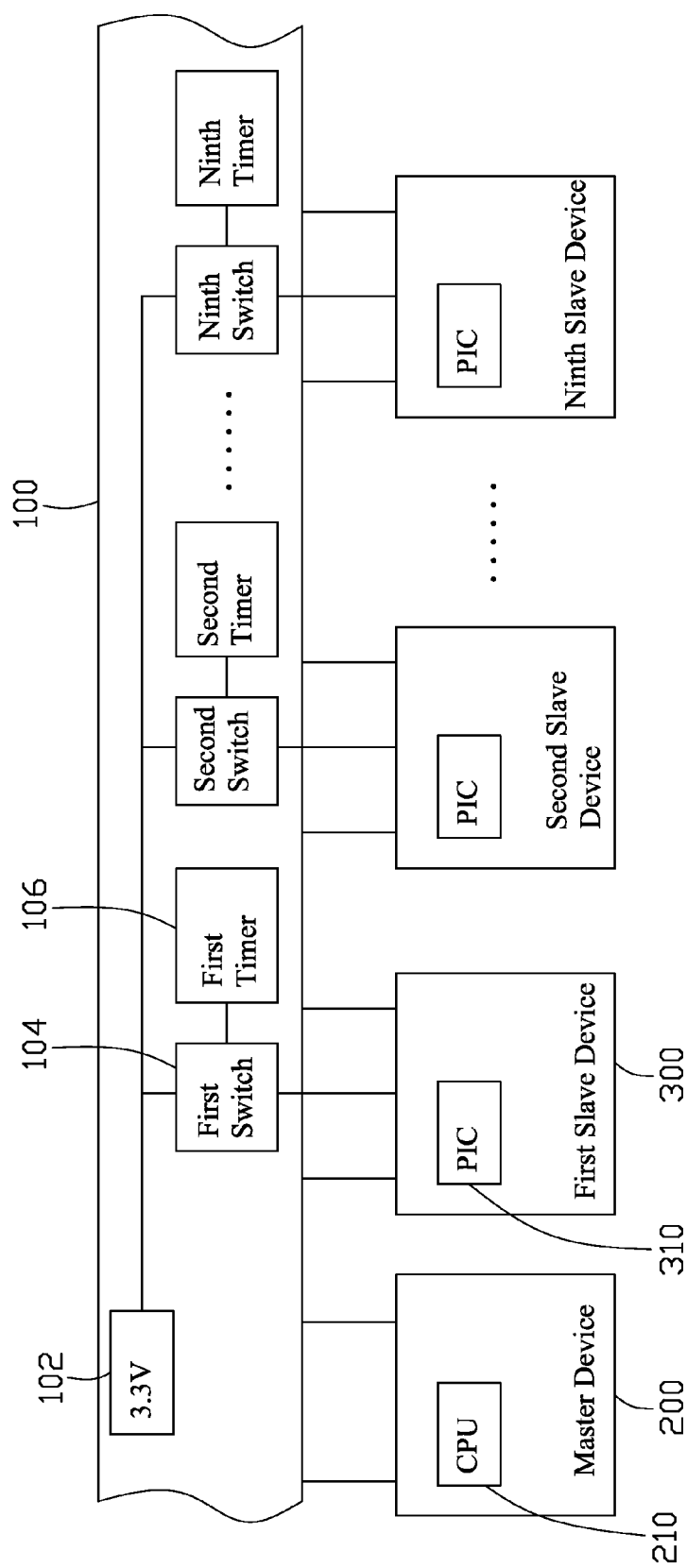
FIG. 3 is a block diagram of a master/slave device system according to another embodiment.

Referring to FIG. 3, in other embodiments, in addition to the first slave device 300, a plurality of other slave devices is connected to the baseboard 100, communicating with the master device 200. Each slave device includes a PIC connected to the 3.3V power source via a switch. Each switch is connected to a timer. When the baseboard 100 is powered on and the 3.3V power source 102 is generated, each timer begins. If the timer reaches a first predetermined time, the first timer 106 informs the first switch 104, which is switched on to supply the 3.3V power source 102 to the PIC 310 of the first slave device 300. The PIC 310 sets the address for the first slave device 300. Other slave devices set their addresses in a similar manner.

As shown in FIG. 3, the master/slave device system includes nine slave devices. The slave devices are supplied by the 3.3V power source 102 after different times, and each sets its unique address according to a time of receiving the 3.3v power source 102. The following shows detailed address assignment for each slave device:

| Device | Related counter | Predetermined duration time | Address |
|---|---|---|---|
| First slave device | First counter | 1 S | 1 |
| Second slave device | Second counter | 2 S | 2 |
| Third slave device | Third counter | 3 S | 3 |
| Fourth slave device | Fourth counter | 4 S | 4 |
| Fifth slave device | Fifth counter | 5 S | 5 |
| Sixth slave device | Sixth counter | 6 S | 6 |
| Seventh slave device | Seventh counter | 7 S | 7 |
| Eighth slave device | Eighth counter | 8 S | 8 |
| Ninth slave device | Ninth counter | 9 S | 9 |

Figure 4:
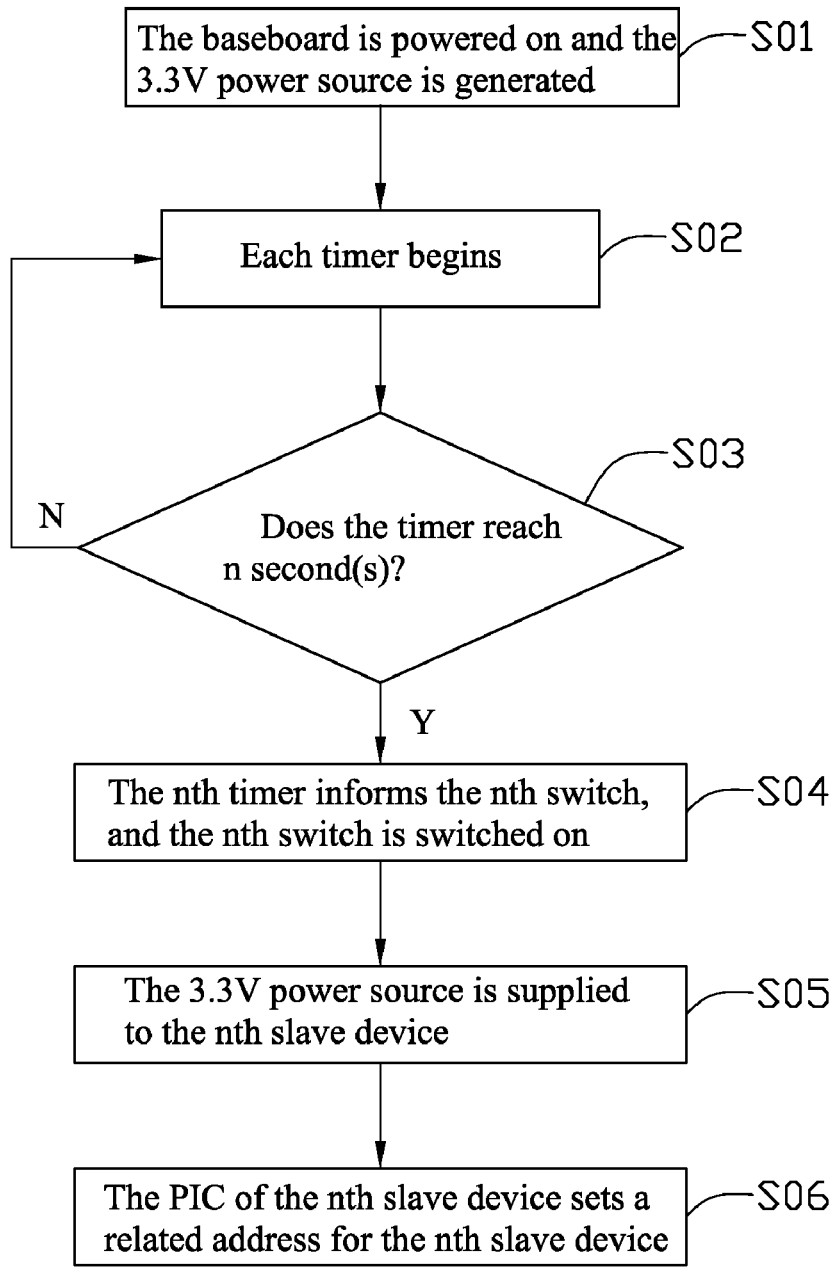
FIG. 4 is a flowchart showing assignment of addresses for slave devices of the system of FIG. 3.

Referring to FIG. 4, assignment of addresses for slave devices of the system of FIG. 3 takes place as follows.

In block S01, the baseboard 100 is powered on and the 3.3V power source is generated.

In block S02, each timer begins.

In block S03, it is determined whether the timer has reached n (n=1, 2, . . . , 9) second(s). If so, block S04 is implemented, and, if not, block S02 is repeated.

In block S04, the nth timer informs the nth switch, and the nth switch is switched on. For example, if the first timer 106 determines that 1 second is reached, the first switch 104 is switched on; if the second timer determines that 2 seconds is reached, the second switch is switched on; and if the ninth timer determines that 9 seconds is reached, the ninth switch is switched on.

In block S05, the 3.3V power source 102 begins to supply power to the nth slave device.

In block S06, the PIC of the nth slave device sets a related address according to the waiting time of receiving the 3.3V power source 102.

In one embodiment, the switches and the counters can be installed on the baseboard 100 or installed on the slave devices. The switches can be respectively connected by different counters or commonly connected by one counter.

While the present invention has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present invention will readily appear to those skilled in the art. Therefore, the present invention is not limited to the specific details and illustrative examples shown and described.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A master/slave device system comprising:
a baseboard comprising a power source;
a master device connected to the baseboard;
at least one slave device, connected to the baseboard, capable of communicating with the master device;
a switch connected between the power source and the at least one slave device;
wherein the switch is capable of switching on when a predetermined time is reached, the at least one slave device is capable of automatically setting an address corresponding to the predetermined time, and the master device is capable of identifying the at least one slave device using the address.

2. The master/slave device system of claim 1, wherein the at least one slave device comprises a Peripheral Interface Controller (PIC), the switch is connected between the power source and the PIC, and the power source is capable of providing a reference voltage to the PIC.

3. The master/slave device system of claim 2, wherein the PIC comprises a reference voltage detection module capable of determining the reference voltage, an address assignment module capable of setting the address, and a storage module capable of storing the address.

4. The master/slave device system of claim 1, further comprising a timer connected to the switch, and the timer is capable of informing the switch when the predetermined time is reached.

5. The master/slave device system of claim 4, wherein the switch and the timer are installed on the baseboard.

6. The master/slave device system of claim 4, wherein the switch and the timer are installed on the at least one slave device.

7. The master/slave device system of claim 1, wherein the master device comprises a Central Processing Unit capable of communicating with the at least one slave device.

8. A master/slave device system comprising:
a baseboard comprising a power source;
a master device connected to the baseboard;
a first slave device communicatively connected to the master device via the baseboard and switchingly connected to the power source;
wherein the first slave device is supplied by the power source after a first predetermined time and is capable of setting a first address according to the first predetermined time, and the master device is capable of identifying the first slave device using the first address.

9. The master/slave device system of claim 8, further comprising a second slave device communicatively connected to the master device via the baseboard, and the second slave device is capable of being supplied by the power source after a second predetermined time and is capable of setting a second address according to a second predetermined time.

10. The master/slave device system of claim 9, further comprising a first switch connected between the power source and the first slave device and a second switch connected between the power source and the second slave device, the first switch is capable of closing after the first predetermined time, and the second switch is capable of closing after the second predetermined time.

11. The master/slave device system of claim 10, wherein each first and second slave device comprises a Peripheral Interface Controller (PIC), the first switch is connected between the power source and the first slave device's PIC, and the second switch is connected between the power source and the second slave device's PIC.

12. The master/slave device system of claim 10, further comprising a first timer connected to the first switch and a second timer connected to the second switch, the first timer is capable of informing the first switch when the first predetermined time is reached, and the second timer is capable of informing the second switch when the second predetermined time is reached.

13. The master/slave device system of claim 10, further comprising a timer connected to the first switch and the second switch, and the timer is capable of informing the first switch when the first predetermined time is reached and informing the second switch when the second predetermined time is reached.

14. The master/slave device system of claim 8, wherein the first slave device comprises a reference voltage detection module capable of determining whether the power source is supplied to the first slave device, an address assignment module capable of setting the first address, and a storage module capable of storing the first address.

* * * * *